United States Patent [19]

Chan

[11] Patent Number: 4,672,090

[45] Date of Patent: Jun. 9, 1987

[54] SURFACTANT SYSTEM FOR EMULSION POLYMERS

[75] Inventor: Marie S. Chan, Library, Pa.

[73] Assignee: Calgon Corporation, Pittsburgh, Pa.

[21] Appl. No.: 757,966

[22] Filed: Jul. 23, 1985

Related U.S. Application Data

[62] Division of Ser. No. 596,798, Apr. 4, 1984, abandoned.

[51] Int. Cl.$^4$ .................................................. C08K 5/20
[52] U.S. Cl. .................................... 524/728; 524/753; 524/801
[58] Field of Search ......................... 524/801, 728, 753

[56] References Cited

U.S. PATENT DOCUMENTS 4,002,579  1/1977  Mizutani et al. .................... 252/579
4,024,097  5/1977  Slovinsky et al. .................. 524/801

Primary Examiner—Paul R. Michl
Assistant Examiner—Alex H. Walker
Attorney, Agent, or Firm—W. C. Mitchell; R. B. Olson; M. C. Sudol, Jr.

[57] ABSTRACT

The instant invention is directed to a surfactant system for use in manufacturing water-in-oil emulsions of water-soluble polymers made from ethylenically unsaturated monomers comprising 25 to 85 percent, by weight, an oil-soluble alkanolamide, 5 to 35 percent, by weight, a polyoxyethylene derivative of a sorbitan ester, and 0 to 50 percent, by weight sorbitan monooleate.

6 Claims, No Drawings

SURFACTANT SYSTEM FOR EMULSION POLYMERS

This is a division of application Ser. No. 596,798, filed Apr. 4, 1984, now abandoned.

BACKGROUND OF THE INVENTION

Water-soluble polymers can be prepared in several forms. For instance, it is known in the art that water-soluble polymers can be prepared in the dispersed phase of water-in-oil emulsions. This invention is directed to a new primary surfactant system for water-in-oil emulsions of water-soluble, ethylenically unsaturated polymers. More particularly, this invention relates to a process for producing polymer emulsions having greatly improved performance characteristics over other emulsions known in the art, while minimizing costs of manufacture. This invention is additionally directed to emulsions made using the process and surfactant system disclosed herein.

Water-in-oil emulsions are comprised of three components, including: (1) an aqueous phase; (2) a hydrophobic (oil) phase; and (3) a surfactant system. Through extensive research, the inventor has discovered that a surfactant system comprising an oil-soluble alkanolamide, polyoxyethylene derivatives of sorbitan esters and, optionally, sorbitan monooleate, can be used to produce water-in-oil emulsions of ethylenically unsaturated polymers which have the following unexpected characteristics: (1) improved settling storage stability; (2) small particle size; (3) low bulk viscosity; (4) improved high temperature tolerence; (5) low oil content; (6) improved solids loadings; and (7) comparable or improved performance without sacrifice of the above advantages.

U.S. Pat. No. 3,826,771 discloses the use of sorbitan monostearate and sorbitan monooleate as water-in-oil emulsifying agents. U.S. Pat. No. 3,278,506 further discloses the use of ethylene oxide condensates of fatty acid amides as emulsifiers. U.S. Pat. No. 3,284,393 suggests the use of hexadecyl sodium pthalate, sorbitan monooleate, sorbitan monostearate, cetyl or stearyl sodium pthalate and metal soaps as oil-in-water emulsifiers, while U.S. Pat. No. 4,024,097 discloses the use of surfactant systems comprising an oil-soluble alkanolamide, such as Witcamide 511, which is commercially available from Witco Chemical Company, and one or more co-emulsifiers selected from the group consisting of unesterified dialkanol fatty amide, quaternized ammonium salts of fatty tertiary amines, salts of fatty tertiary amines, alkaline metal salts of fatty acids and alkyl or alkylaryl sulfates or sulfonates.

The novel surfactant system described herein is not disclosed or suggested by the above-cited references. In fact, these references most commonly teach the use of so-called low hydrophilic-lipophilic balance (HLB) materials as emulsifying agents such as those having an HLB value of less than 5.0. In contrast, the surfactant system described herein is totally nonionic and requires the use of polyoxyethylene derivatives of sorbitan esters which commonly have HLB values in the range of 9.0 to 11.0.

Disadvantages are inherent in the use of many surfactant systems known in the art. For example, emulsions made with state of the art surfactant systems tend to separate over relatively short periods of time. This problem is closely related to the relatively large particle sizes which are common to presently-known emulsions. Also, high bulk viscosities keep active polymer concentrations low, and contemporary polymer emulsions lack high temperature tolerance. Generally, these difficulties cannot be remedied using known art without diminishing polymer performance. Finally, high oil concentrations of state of the art emulsions keep manufacturing costs high.

Accordingly, the need exists for a surfactant system which reduces oil requirements, and therefore manufacturing costs, improves settling storage stability, lowers emulsion bulk viscosity and improves solids loadings. It is thus an object of this invention to provide a novel surfactant system to the art comprising an oil-soluble alkanolamide, polyoxyethylene derivatives of sorbitan esters, and optionally, sorbitan monooleate, which accomplishes these objectives. It is a further object of this invention to provide to the art a process for the manufacture of water-in-oil emulsions which utilize the novel surfactant system of this invention. It is a still further object of this invention to provide water-in-oil emulsions of ethylenically unsaturated polymers having low oil contents, high solids loadings, improved settling storage stability, low bulk viscosities and low manufacturing costs, without sacrificing molecular weight.

Other objects of this invention will become apparent to those skilled in the art from the following detailed description.

DETAILED DESCRIPTION OF THE INVENTION

This invention relates to a novel surfactant system for use in manufacturing water-in-oil emulsions of water-soluble polymers, especially those made from ethylenically unsaturated monomers, comprising 25 to 85 percent, by weight, an oil-soluble alkanolamide, 5 to 35 percent, by weight, a polyoxyethylene derivative of a sorbitan ester, and 0 to 50 percent, by weight sorbitan monooleate.

Further, this invention relates to an improvement in a water-in-oil emulsion polymerization process comprising:
(1) forming a water-in-oil emulsion of an aqueous solution of at least one water-soluble ethylenically unsaturated monomer in an inert hydrophobic liquid organic dispersion medium; and
(2) polymerizing said monomer or monomers in said dispersion medium to form a polymer emulsion;
the improvement which comprises using a surfactant system which comprises 25 to 85 percent, by weight, an oil-soluble alkanolamide; 5 to 35 percent, by weight, a polyoxyethylene derivative of a sorbitan ester; and 0 to 50 percent, by weight, sorbitan monooleate; wherein said surfactant system constitutes 0.1 to 15.0 percent, by weight, of the total emulsion.

The surfactant system described herein constitutes an advancement in the art of emulsion polymerization. It is generally applicable to processes for the manufacture of nonionic or anionic water-soluble emulsion polymers of ethylenically unsaturated monomers such as acrylamide, methacrylamide, N,N-dimethyl acrylamide, acrylic acid, methacrylic acid, acrylonitrile, vinyl sulfonic acid, styrene sulfonate B-carboxy ethyl acrylate and acrylamido methylpropane sulfonic acid, alone or in combination. Also, this novel surfactant system can be used in processes for the manufacture of cationic emulsion polymers, such as polymers made from cationic monomers selected from the group consisting of dimethyldiallyl ammonium chloride (DMDAAC), diethyldiallyl ammonium chloride (DEDAAC), methacryloyloxyethyl trimethyl ammonium chloride (METAC), methacryloyloxyethyl trimethyl ammonium methosulfate (METAMS), methacrylamido propyl trimethyl ammonium chloride (MAPTAC), acryloyloxyethyl trimethyl ammonium chloride, acryloyloxyethyl trimethyl ammonium methosulfate, and quaternized derivatives of N,N-dimethyl amino ethyl methacrylate, alone or in combination, or polymers made by combining the above-listed cationic monomers with acrylamide, methacrylamide or N,N-dimethylacrylamide.

The molecular weights of these polymers are critical and must remain high. The preferred molecular weights are greater than or equal to 1,000,000, which corresponds to intrinsic viscosities of at least 10.0 dl/g in a 1.0 N sodium chloride solution at 30° C.

Water-in-oil emulsions are comprised of three components including: (1) a hydrophobic phase; (2) an aqueous phase; and (3) a surfactant system. The hydrophobic phase may be from 10 to 40 percent, by weight, of the emulsion. Any inert hydrophobic liquid can be used. The preferred hydrophobic liquids are those selected from the group consisting of benzene, xylene, toluene, mineral oils, kerosene, naphthas, petroleums, and blends of aromatic and aliphatic hydrocarbons containing 4 or greater carbon atoms. The most preferred hydrophobic liquids are those selected from the group consisting of a narrow fraction of a branch-chain hydrocarbon sold by Witco Chemical Company under the tradename Kensol 61 and a branch-chain isoparafinic hydrocarbon sold by Exxon under the tradename Isopar M.

The aqueous phase may be from 55 to 85 percent, by weight, of the emulsion. This phase comprises the desired monomer or monomers dissolved in water. Additionally, the phase may contain an effective amount of a chelating agent, such as a sodium salt of ethylene diamine tetraacetic acid (EDTA) or nitrilotriacetate (NTA). The active polymer concentration may range from 20 to 50 percent, by weight, of the emulsion.

The surfactant system itself comprises 25 to 85 percent, by weight, an oil-soluble alkanolamide; 5 to 35 percent, by weight, a polyoxyethylene derivative of a sorbitan ester; and 0 to 50 percent, by weight, sorbitan monooleate. Additionally, other surfactants, such as sorbitan monostearate, may be used in combination with the above-listed surfactants.

Preferably, the surfactant system comprises 70 to 80 percent, by weight, an oil-soluble alkanolamide; 10 to 30 percent, by weight, a polyoxyethylene derivative of a sorbitan ester; and 0 to 15 percent, by weight, sorbitan monooleate.

The surfactant system may comprise from 0.5 to 15 percent, by weight, of the emulsion. Preferably, the surfactant system comprises 1 to 5 percent, by weight, of the emulsion.

Any oil-soluble alkanolamide is acceptable. The preferred oil-soluble alkanolamides are the alkanol fatty amide surfactants, such as Clintwood LT-10-8-1, which is commercially available from Clintwood Chemical Company. The most preferred oil-soluble alkanolamide is a partially-esterified N,N-alkanol fatty amide surfactant called Witcamide 511, which is commercially available from Witco Chemical Company. This surfactant is described in the literature as being approximately 50 percent, by weight, unesterified N,N-diethanol fatty amide, approximately 40 percent, by weight, monoesterified N,N-diethanol fatty amide and some quantity of diesterified material, wherein the fatty groups on the emulsifier chain are approximately 64 percent oleyl, 33 percent linoleic and 3 percent palmetyl.

Any polyoxyethylene derivative of a sorbitan ester is acceptable for use in the instant surfactant systems. The preferred polyoxyethylene derivatives of a sorbitan ester are polyoxyethylene (4) sorbitan monostearate, which has 4 oxyethylene units per mole of ester, and polyoxyethylene (5) sorbitan monooleate, which has 5 oxyethylene units per mole of ester. These products are available commercially from ICI Americas Incorporated under the tradenames Tween 61 and Tween 81, respectively. Similar products are also available from Glyco Chemicals, Inc. under the tradenames Glycosperse S-4 and Glycosperse O-5, respectively.

Optionally, any fatty acid ester of sorbitan can be used in the instant surfactant systems. The preferred fatty acid esters of sorbitan are sorbitan monooleate, commercially available from ICI Americas, Inc. under the tradename of Span 80 and from Glyco Chemicals Inc. under the tradename Glycomul O, and sorbitan monostearate, which is commercially available from Glyco Chemicals Inc. under the tradename Glycomul S. The most preferred fatty acid ester of sorbitan is sorbitan monooleate.

Emulsion polymers are generally produced by first mixing the surfactant system with the hydrophobic phase. The aqueous phase is then prepared by adding the monomer(s) to water in the desired concentration. Additionally, a chelant, such as a sodium salt of EDTA may be added to the aqueous solution and the pH of the aqueous phase may be adjusted to 3.0 to 10.0, depending on the monomer(s) used. The aqueous monomer phase is then added to the mix containing the hydrophobic liquid and the surfactant system. The surfactant system enables the aqueous phase, which contains the monomer or monomers to be polymerized, to be emulsified into the hydrophobic phase. Polymerization is then carried out in the presence of a free radical generating catalyst, and the temperature of the reaction mixture is maintained between 5° and 100° C., preferably between 20° and 50° C.

The inventor has surprisingly discovered that the novel surfactant system disclosed herein allows the manufacture of emulsion polymers having improved settling storage stability, improved high temperature tolerance, and improved solids loadings. These products have low bulk viscosities and small particle sizes. Additionally, the instant surfactant system reduces the oil concentration of these products, thereby lowering their manufacturing costs.

EXAMPLES

The following examples illustrate the instant invention in greater detail. However, it should be understood that the inventon is in no way limited by these examples.

EXAMPLES 1 through 5

Nonionic emulsion polymers of acrylamide were manufactured. In each of these examples, the aqueous phase comprised 30.0 parts acrylamide, 40.217 parts water, 0.033 parts sodium salt EDTA, and 1.75 parts ammonium chloride. The pH of this phase was adjusted to 7.0. 26.0 parts Kensol 61, which comprised the hydrophobic phase, and 2.0 parts of the chosen surfactant system were then mixed, and the aqueous phase was added to the oil/surfactant mixture. Polymerization was initiated using a tertiary butyl hydroperoxide/sodium metabisulfite catalyst system under nitrogen and the temperature of the reaction vessel was maintained between 35° and 45° C. Results are shown in Table I, below. In this table, the centrifuge test measured the settling stability of the emulsions. One hundred grams of each polymer emulsion was centrifuged at 1500 RPM for 1 hour, 2000 RPM for 0.5 hour and 3000 RPM for 0.5 hour; then the weight percent of the compacted material was determined. These values are shown as "% Compaction" in Table I.

Reduced viscosities of the polymers were measured at 0.05 g/dl using a 1.0 N sodium chloride solution at 30° C. These values are shown as "dl/g" in Table I. Viscosities of the emulsions were measured using a Brookfield Model LVT Viscometer and are shown in cps in Table I.

The silica settling test measured the relative polymer dosages required to settle a standard silica suspension to a 5-inch depth in 75 seconds. The standard silica suspension was prepared by adding 150 g of 200 mesh quartz to 200 mls of distilled water, and then diluting the suspension to 790 mls using additional distilled water. The values shown in Table I are ratios of the grams of polymer required for the desired settling rate (5 inches in 75 seconds) over the grams of polymer used in Example 1 (Witcamide/Span 80) to achieve this desired settling rate.

methylchloride quat of N,N-dimethylamino methyl methacrylate, 31.967 parts water, and 0.033 parts ethylene diamine tetraacetic acid (tetrasodium salt). The aqueous phase was added to a mixture comprising 26.0 parts Kensol 61 and 2.0 parts of the chosen surfactant system. Polymerization was initiated using the free radical generating catalyst system of Examples 1 through 5 under nitrogen, and the temperature of the reaction vessel was maintained at 40° C.±5° C. The results of these polymerizations are shown in Table II, below. In this table, centrifuge test results were obtained as in Examples 1 through 5.

TABLE II

| Example No. | Surfactant System | Surfactant System Composition (Weight %) | % Active Polymer | Brookfield Viscosity (cps) | Centrifuge Test (% Compaction) |
| --- | --- | --- | --- | --- | --- |
| 6* | Witcamide 511/Span 80 | 25/75 | 40.00 | 2350 | 69.5 |
| 7 | Witcamide 511/Tween 61 | 75/25 | 40.00 | 875 | 3.5 |

*Comparison Example

EXAMPLES 8 through 11

In these examples, copolymers of acrylamide and dimethyl sulfate quat of N,N-dimethylamino methyl methacrylate were emulsified. The aqueous phase comprised 21.5 parts acrylamide, 3.75 parts dimethyl sulfate quat of N,N-dimethylamino ethyl methacrylate, 48.90 parts water and 0.1 parts ethylene diamine tetraacetic acid (tetrasodium salt). The aqueous phase was added to a mixture comprising 24.0 parts Kensol 61, and 2.0 parts of the chosen surfactant system. Polymerization was initiated using the free radical generating catalyst system of Examples 1 through 5 under nitrogen, and the temperature of the reactants was allowed to exotherm to 90° C. The results are shown in Table III, below.

TABLE I

| Example No. | Surfactant System | Surfactant System Composition (Weight %) | % Active Polymer | Brookfield Viscosity (cps) | Mean Diameter of Polymer Particles ($\mu$) | Centrifuge Test (% Compaction) | n0.05 1.0 N NaCl (dl/g) | Silica Settling Test (Equivalent Dosage Ratio) |
| --- | --- | --- | --- | --- | --- | --- | --- | --- |
| 1* | Witcamide 511[1]/Span 80[2] | 25/75 | 30.0 | 1850 | 1.65 | 66.6 | 22.0 | 1.0 |
| 2* | Witcamide 511 | 100 | 30.0 | 1275 | 0.18 | 6.1 | 18.0 | 1.29 |
| 3 | Witcamide 511/Tween 61[3] | 75/25 | 30.0 | 800 | 0.21 | 8.0 | 20.0 | 1.06 |
| 4 | Witcamide 511/Tween 61 | 75/25 | 33.3 | 950 | 0.26 | 11.4 | 20.0 | — |
| 5 | Witcamide 511/Span 80/Tween 81[4] | 75/12.5/12.5 | 30.0 | 1100 | — | 11.4 | 20.0 | — |

*Comparison Example
[1]Witcamide 511 is a partially-esterified N,N—alkanol fatty amide, available from Witco Chemical Company.
[2]Span 80 is sorbitan monooleate, available from ICI Americas, Inc.
[3]Tween 61 is polyoxyethylene (4) sorbitan monostearate, available from ICI Americas, Inc.
[4]Tween 81 is polyoxyethylene (5) sorbitan monooleate, available from ICI Americas, Inc.

These Examples show that conventional surfactant systems give emulsion polymers which are deficient in stability (percent compacation), performance (reduced viscosity and silica settling), and/or particle size/-Brookfield viscosity relative to the emulsion polymers of the instant invention.

EXAMPLES 6 and 7

In Examples 6 and 7, copolymers of acrylamide and methylchloride quat of N,N-dimethylamino ethyl methacrylate were emulsified. In these Examples, the aqueous phase comprised 16.0 parts acrylamide, 24.0 parts Reduced viscosity, Brookfield viscosity and percent compaction values were obtained as described in Examples 1 through 5. The Drainage/Retention performance values were obtained using the Schopper-Reigler Freeness Test. The paper stock furnish used was a 50:50 percent blend of hardwood and softwood pulps which contained 13 percent (by weight of dry pulp) clay, 2 percent $TiO_2$, 2 percent alum and 1 percent rosin. The polymer dosage in each case was 0.5 lb/ton. The values shown in Table III measure percent increase in drainage and retention over a blank furnish which contained no polymer.

TABLE III

| Example No. | Surfactant System | Surfactant System Composition (Weight %) | % Active Polymer | Brookfield Viscosity (cps) | Mean Diameter of Polymer Particles ($\mu$) | Centrifuge Test (% Compaction) | n0.05 1.0 N NaCl (dl/g) | Drainage/Retention Performance (% Increase Over Blank) | |
|---|---|---|---|---|---|---|---|---|---|
| | | | | | | | | Retention | Drainage |
| 8* | Witcamide 511/Span 80 | 25/75 | 25 | 2350 | 0.27 | 47.6 | 16.7 | 58 | 145 |
| 9* | Witcamide 511/Span 80 | 75/25 | 25 | 1700 | — | 13.5 | — | — | — |
| 10* | Witcamide 511 | 100 | 25 | 200 | 0.21 | 7.1 | 8.8 | 44 | 133 |
| 11 | Witcamide 511/Span 80/Tween 61 | 75/12.5/12.5 | 25 | 1100 | 0.22 | 5.1 | 16.1 | 56 | 144 |

*Comparison Example

These results show that the polymer emulsions made with conventional surfactant systems have poorer stability (percent compaction) and/or performance characteristics (reduced viscosity, drainage/retention) than polymer emulsions made using the instant invention.

What is claimed is:

1. In a water-in-oil emulsion polymerization process which comprises:
   (1) forming a water-in-oil emulsion of an aqueous solution of at least one water-soluble ethylenically unsaturated monomer in an inert hydrophobic liquid organic dispersion medium and
   (2) polymerizing said monomer or monomers in said dispersion medium to form a polymer emulsion, using a free radical generating catalyst to initiate the reaction, and controlling the temperature of the reaction mix to between 5° and 100° C., the improvement which comprises using a surfactant system which comprises 25 to 85 percent, by weight, an oil-soluble alkanolamide; 5 to 35 percent, by weight, of a polyoxyethylene derivative of a sorbitan ester; and 0 to 50 percent, by weight, sorbitan monooleate; wherein said surfactant system constitutes 0.1 to 15.0 percent, by weight, of the total emulsion.

2. The improved process of claim 1, wherein said oil-soluble alkanolamide of said surfactant system is a partially-esterified N,N-alkanol fatty amide, and wherein said polyoxyethylene derivative of a sorbitan ester is selected from the group of polyoxyethylene (4) sorbitan monostearate and polyoxyethylene (5) sorbitan monooleate.

3. The improved process of claim 2, wherein said surfactant system comprises a partially-esterified N,N-alkanol fatty amide and polyoxyethylene (4) sorbitan monostearate.

4. The improved process of claim 1, wherein said surfactant system comprises a partially-esterified N,N-alkanol fatty amide and polyoxyethylene (5) sorbitan monooleate.

5. The improved process of claim 1, wherein said surfactant system comprises 1.0 to 5.0 percent, by weight, of said polymer emulsion.

6. The improved process of claim 1, wherein said polymer is selected from the group consisting of polymers prepared from acrylamide, methacrylamide, N,N-dimethyl acrylamide, acrylic acid, methacrylic acid, acrylonitrile, vinyl sulfonic acid, styrene sulfonic acid, $\beta$-carboxy ethyl acrylate, and acrylamido methylpropane sulfonic acid, N,N-dimethyl amino ethyl methacrylate, dimethyldiallyl ammonium chloride, diethyldiallyl ammonium chloride, methacryloyloxyethyl trimethyl ammonium chloride, methacryloyloxyethyl trimethyl ammonium methosulfate, acryloyloxyethyl trimethyl ammonium chloride, acryloyloxyethyl trimethyl ammonium methosulfate, and methacrylamido propyl trimethyl ammonium chloride, alone or in combination.

* * * * *